Aug. 2, 1955
L. BLOK ET AL
2,714,648
HIGH FREQUENCY HEATING
Filed May 21, 1952
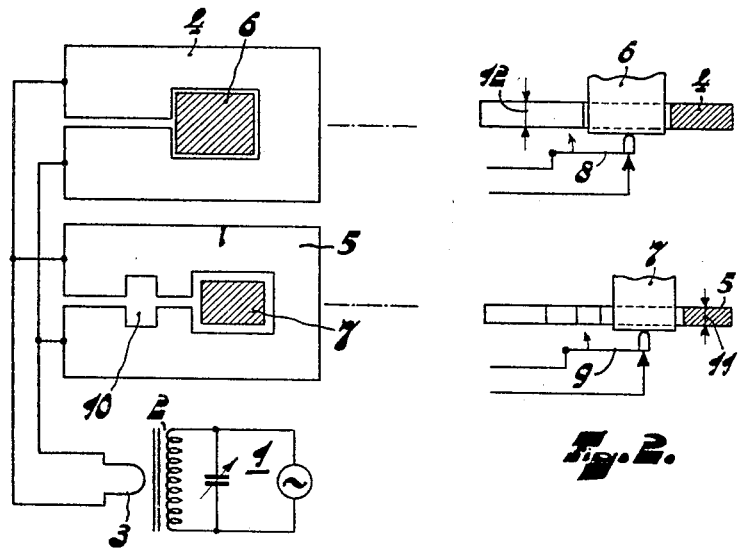
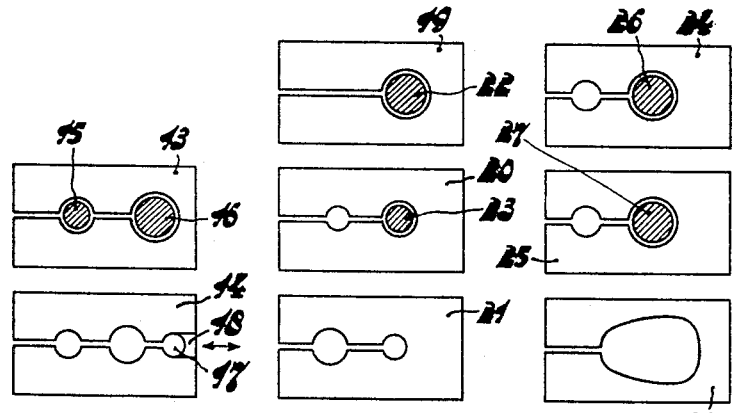
INVENTOR
Lourens Blok
Dirk Christiaan Van Iperen
BY Fred M. Vogel
AGENT

United States Patent Office 2,714,648
Patented Aug. 2, 1955

2,714,648

HIGH FREQUENCY HEATING

Lourens Blok and Dirk Christiaan Van Iperen, Eindhoven, Netherlands, assignors to Hartford National Bank and Trust Company, Hartford, Conn., as trustee Application May 21, 1952, Serial No. 289,052

Claims priority, application Netherlands June 2, 1951

5 Claims. (Cl. 219—10.79)

This invention relates to methods of heating workpieces having different heating areas by induced high-frequency currents with the aid of two or more so-called inductors or work coils (or groups of inductors). The expression "different heating areas" is to be understood to mean that with workpieces, for example of the same shape and size, the level of the heating area is different or the workpieces are of different shape and/or size with the same level of the said area.

In a known method of this type, the inductors are simultaneously loaded with different workpieces, as for example in the method described in U. S. Patent No. 2,271,916. This requires a source of high-frequency energy of comparatively high power in order that several workpieces may be adequately heated simultaneously.

In practice however it occurs that only one workpiece is required to be heated at a time—for example when supplied individually on a conveyer belt—and usually the workpieces are of different shape and size. This has the advantage that the power of the source of energy can be relatively lower so that a smaller high-frequency generator can be used, since each time only one workpiece needs to be heated, so that the load is smaller than when treating a plurality of workpieces. However, there is a limitation in that the time required for heating each individual workpiece must be matched thereto and, as a rule, the inductors must also be interchanged.

This limitation may be met with the use of the invention.

In the method according to the invention, the parallel-connected inductors have different impedances in the unloaded state and are so proportioned or designed that at least one of the inductors, in the state loaded with the workpiece, has an impedance which is so chosen with respect to the impedance of at least one of the other inductors, also in the state loaded with the workpiece, that the inductors, which are alternately loaded with the workpieces, are heated for equal or substantially equal times. This is more particularly of importance if the impedance of the unloaded inductor is high relatively to that of the loaded inductor, since in this event the former takes only little current.

This yields the advantage that the time required for heating, which may be determined by means of an automatic device, need not be varied or adjusted each time for different workpieces. The workpieces may consist of different materials and the heating temperature of one workpiece may be different from that of the other.

Dependent on the power of the source of high-frequency energy, groups of inductors instead of single inductors may be used.

According to a further feature of the invention, the said inductors (or groups of inductors) have equal or substantially equal impedances in the loaded state, so that the workpieces, which may consist of the same material, are heated to the same or substantially the same temperature, since the current strength remains the same or substantially the same. The phrase "the same or substantially the same temperature" is here to be understood to include the tolerances generally deemed permissible for the desired heating. If, for example, a tinware is to be soldered it will not matter whether the soldering temperature for one article is 200° C. and for a following article 220° C. or whether, in hardening articles, the hardening temperature for one of them is 750° C. and for the other 830° C.

As is known the temperature produced in the workpiece is proportional to $i^2rt$, where $i$ represents the current strength, $r$ the resistance of the material to be treated and $t$ the heating time. Since the impedances of the alternately loaded inductors are equal, the current strengths I in the inductors will also be equal as well as, with the same coupling between inductor and workpiece, the current strength $i$ produced therein. The temperatures produced in the different workpieces of the same material will be equal, since the levels of the heating area and the heating times $t$ are equal, the said temperatures depending only upon the resistance $r$. Hence, a large workpiece having a higher resistance $r$ is supplied with more heat than a smaller workpiece, so that the energy supplied in watts by the source of energy is different each time. In accordance with its mass, however, a large workpiece requires more energy than a small workpiece to attain the same temperature.

The invention also concerns a high-frequency generator having the feature that the output terminals of the generator are connected to two or more parallel-connected inductors (or groups of inductors) so proportioned or designed as to be suitable for carrying out the above-described method according to the invention.

In order that the invention may be readily carried into effect, an example will now be described in greater detail with reference to the accompanying drawings, in which:

In Fig. 1, a high-frequency generator 1 is connected through a transformer 2 to a secondary winding 3 with which two inductors 4 and 5 are connected in parallel. It will be assumed that the generator remains connected. Since the inductors 4 and 5 are unloaded their impedance is comparatively high, so that little energy is supplied by the generator. A workpiece 6 is then introduced into the inductor 4 and heated for, say, 10 secs., whereupon it is removed. This time, may, for example, be read off on a clockwork. Subsequently another workpiece 7, for example of different size or different material is treated (if required at a different temperature). To this end the impedance of the inductor 5, in the state loaded with the workpiece 7, is so chosen with respect to the impedance of the inductor 4 in the state loaded with the workpiece 6 that in this case also a time of 10 secs. is sufficient for the desired heating or temperature of the workpiece 7. Hence, the operator only needs to consider this time of 10 secs., which is contributive to regular and rapid operation while errors are avoided as much as possible. This method of alternative heating of workpieces may, for example, be used in making workpieces such as tins of different size for foodstuffs supplied on a conveyer belt. Instead of connecting two inductors it is also possible to connect in parallel three or more inductors if three or more different workpieces are required to be treated successively for equal time periods.

This method is of particular importance, if as is known per se and customary, the time is automatically adjustable by means of a suitable device. In this case, the generator may also be connected automatically, for example by means of switches 8 and 9 (Fig. 2). On introducing the workpiece 6 into the aperture of the inductor 4 the switch 8, included in an operating circuit of the generator, is closed so that heating occurs during the time adjusted, the generator subsequently being disconnected automatically. After removal of the workpiece 6 and in the automatically open position of switch 8, the workpiece 7 may be introduced into the inductor 5, whereby switch 9 is closed, the generator is started and heating takes place for the same adjusted time. Since the said impedance of the unloaded inductor materially exceeds that of the loaded inductor only little power will be taken up by the unloaded inductor.

Figs. 1 and 2 also show how the impedance of the inductor 5 is matched to that of inductor 4, viz. in the manner known per se from U. S. patent specification 2,528,714 by means of an additional opening 10 in series with the working opening of the inductor 5, by a thickness 11 of the inductor 5 smaller than the height 12 of the inductor 4 and further by the space between workpiece 7 and inductor 5 larger than that between 6 and 4. The impedance of the inductor 5 is increased by the opening 10 and the smaller thickness 11. The size of the opening 10 may be adjustable by means of adjustable intermediate pieces.

If the workpieces consist of the same material and are required to be heated to the same temperature, while the coupling between workpiece and inductor is also the same, the said impedances, according to the invention, are chosen to be equal or substantially equal in the loaded state.

Fig. 3 shows two inductors 13 and 14 that are alternately used for heating two workpieces per inductor at a time. Thus, for example, first the inductor 13 is loaded with the workpieces 15, 16 and subsequently the inductor 14 with two other workpieces. The additional opening 17 serves for adjustment of the correct impedance in the loaded state, which will in general be equal to the impedance of the inductor 13 in the loaded state. The opening 17 and consequently the impedance are variable by means of a slidable intermediate piece 18.

In Fig. 4, the impedance of inductors 19, 20 in the loaded state is made equal to that of inductors 20, 21 so that in this case also two workpieces 22 and 23 can be heated at a time, whereupon two further workpieces can be heated simultaneously in inductors 20 and 21. In the loaded state, the inductors 19, 20 preferably have the same impedance, so that the workpieces 22, 23 which differ only in circumference, are heated to the same temperature.

In Fig. 5, the two similar inductors 24, 25 are loaded simultaneously with similar workpieces 26, 27, the inductor 28 being subsequently loaded with only one workpiece. In the loaded state, the total impedance of the inductors 24, 25 is chosen to be one half of that of the loaded inductor 28, so that the power supplied by the generator to the workpieces 26, 27 is different from the power supplied to the loaded inductor 28, the heating times being equal. However, the first-mentioned power is evenly divided among the two workpieces 26, 27, since the two loaded inductors 24, 25 have the same impedance.

It is advisable for the impedance of the supply conductors to the parallel-connected inductors to be made small with respect to the impedance of these inductors. This permits the changing of the junction points of the conductors without the impedance of the inductors being appreciably affected by the impedance of the supply conductors.

We claim:

1. An apparatus for concurrently heating a plurality of workpieces having different areas with high frequency currents comprising a like plurality of inductive elements, supply conductors coupling said inductive elements, said workpieces to be loaded thereby, and means to apply high frequency current in parallel relation through said conductors to said elements, said elements in the unloaded state having different impedance values and in the loaded state, said elements having other impedance values and current flowing through each of said other impedances for substantially the same amount of time thereby heating each of the workpieces to substantially the same temperature, and said supply conductors having a low impedance relative to the impedance of said inductive elements.

2. An apparatus as set forth in claim 1 wherein said inductive elements have equal impedance values in the loaded state.

3. An apparatus as set forth in claim 1 wherein said workpieces have a rectangular cross-section and wherein the openings in said elements have rectangular portions adapting said elements to receive said workpieces.

4. An apparatus as set forth in claim 1 wherein said workpieces have a circular cross-section and wherein the openings in said elements have circular portions adapting said elements to receive said workpieces.

5. An apparatus for concurrently heating a plurality of workpieces having different areas with high frequency currents comprising a like plurality of inductive elements coupled to said workpieces to be loaded thereby, a high frequency generator, supply leads connecting said impedance elements in parallel relation to said generator, said supply leads having a low impedance relative to the impedance of said inductive elements, said elements in the unloaded state having different impedance values and in the loaded state said elements having other impedance values and current flowing through each of said other impedances for substantially the same amount of time thereby heating each of the workpieces to substantially the same temperature, and switching means in said generator for automatically controlling the timing sequence for heating each of said workpieces.

References Cited in the file of this patent

UNITED STATES PATENTS

| | | |
|---|---|---|
| 2,271,916 | Denneen et al. | Feb. 3, 1942 |
| 2,321,189 | Dravneek | June 8, 1943 |
| 2,353,130 | Dravneek | July 11, 1944 |
| 2,402,508 | Strickland, Jr. | June 18, 1946 |
| 2,471,471 | Wood | May 31, 1949 |
| 2,528,714 | Wadhams | Nov. 7, 1950 |